(12) United States Patent
Petrovic et al.

(10) Patent No.: US 7,631,247 B2
(45) Date of Patent: *Dec. 8, 2009

(54) METHOD OF PROCESS CONFIGURATION FOR MULTIPLE HARQ PROCESSES

(75) Inventors: Dragan Petrovic, Darmstadt (DE); Elko Seidel, Darmstadt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 421 days.

This patent is subject to a terminal disclaimer.

(21) Appl. No.: 10/524,142

(22) PCT Filed: Jun. 24, 2003

(86) PCT No.: PCT/EP03/06626

§ 371 (c)(1),
(2), (4) Date: Sep. 8, 2005

(87) PCT Pub. No.: WO2004/019543

PCT Pub. Date: Mar. 4, 2004

(65) Prior Publication Data

US 2006/0092973 A1 May 4, 2006

(30) Foreign Application Priority Data

Aug. 13, 2002 (EP) .................. 02018085

(51) Int. Cl.
*H03M 13/00* (2006.01)
(52) U.S. Cl. .................. 714/776; 714/755; 370/444
(58) Field of Classification Search ................. 714/776, 714/755; 370/444
See application file for complete search history.

(56) References Cited

U.S. PATENT DOCUMENTS

| 5,271,012 | A | * | 12/1993 | Blaum et al. ................... 714/6 |
| 6,023,783 | A | * | 2/2000 | Divsalar et al. ............. 714/792 |
| 6,901,063 | B2 | * | 5/2005 | Vayanos et al. ............. 370/335 |
| 7,292,854 | B2 | * | 11/2007 | Das et al. ..................... 455/434 |
| 2002/0004924 | A1 | * | 1/2002 | Kim et al. ..................... 714/752 |
| 2005/0022098 | A1 | * | 1/2005 | Vayanos et al. ............. 714/776 |
| 2006/0092972 | A1 | * | 5/2006 | Petrovic et al. ............. 370/469 |
| 2008/0008152 | A1 | * | 1/2008 | Lohr et al. ................... 370/342 |

FOREIGN PATENT DOCUMENTS

| EP | 1207647 | 5/2002 |
| WO | 03036844 | 5/2003 |

OTHER PUBLICATIONS

PCT International Search Report dated Oct. 10, 2003.

(Continued)

*Primary Examiner*—M. Mujtaba K Chaudry
(74) *Attorney, Agent, or Firm*—Dickinson Wright PLLC

(57) ABSTRACT

A method of HARQ process configuration in a mobile communication system, wherein a plurality of HARQ processes are transmitted from a transmitter to a receiver comprising the step of configuring a plurality of HARQ processes of unrestricted use for data flows having different priorities and the step of pre-configuring at least one reserved HARQ process for specific data flows of high priority. According to another embodiment, instead of a reserved HARQ process, an additional HARQ process is pre-configured.

14 Claims, 6 Drawing Sheets

OTHER PUBLICATIONS

S. Kallel, et al.; "Throughput Performance of Memory ARQ Schemes," IEEE Transactions on Vehicular Technology, IEEE Inc. New York, US, vol. 48, No. 3, May 1999, pp. 891-899, XP000906444, ISSN: 0018-9545.

Ghosh, et al., "Performance of Coded Higher Order Modulation and Hybrid ARQ for Next Generation Cellular CDMA System," IEEE, pp. 500-505, 2000.

3GPP TR 25.848 v4.0.0(Mar. 2001) Technical Report, "3$^{rd}$ Generation Partnership Project; Technical Specification Group Radio Access Network; Physical Layer Aspects of UTRA High Speed Downlink Packet, Access (Release 4)," 3$^{rd}$ Generation Partnership Project, Valbonne, France, www.3gpp.org, 3GPP Organizational Partners, 1, 2, 8-26 pages, Mar. 2001.

3GPP TS 25.308 v5.2.0 (Mar. 2002), Technical Specification, "3$^{rd}$ Generation Partnership Project; Technical Specification Group Radio Access Network; High Speed Downlink Packet Access (HSDPA); Overall description; Stage 2 (Release 5)," 3$^{rd}$ Generation Partnership Project, Valbonne, France, www.3gpp.org, 3GPP Organizational Partners, 1-30 pages, Mar. 2002.

* cited by examiner

RELATED ART

RELATED ART

METHOD OF PROCESS CONFIGURATION FOR MULTIPLE HARQ PROCESSES

FIELD OF THE INVENTION

This invention relates to incremental redundancy or hybrid ARQ Type II or III retransmission techniques in mobile communications systems and is particularly applicable to cellular systems.

BACKGROUND OF THE RELATED ART

The most common technique for error detection of non-real time services is based on Automatic Repeat request (ARQ) schemes which is combined with Forward Error Correction (FEC), called hybrid ARQ. If an error is detected by Cyclic Redundancy Check (CRC), the receiver requests the transmitter to send additional bits. From different existing schemes the stop-and-wait (SAW) and selective-repeat (SR) continuous ARQ are most often used in mobile communication.

A data unit (PDU) will be encoded before transmission. Depending on the bits that are retransmitted three different types of ARQ are e.g. defined in S. Kallel, R. Link, S. Bakhtiyari, IEEE Transactions on Vehicular Technology, Vol. 48 #3, May 1999 "Throughput Performance of Memory ARQ Schemes".

Type I: The erroneous PDU is discarded and a new copy of that PDU is retransmitted and decoded separately. There is no combining of earlier and later versions of that PDU.

Type II: The erroneous PDU that needs to be retransmitted is not discarded, but is combined with some incremental redundancy bits provided by the transmitter for subsequent decoding. Retransmitted PDU's sometimes have higher coding rates and are combined at the receiver with the stored values. That means that only little redundancy is added in each retransmission.

Type III: Is the same as Type II only that every retransmitted PDU is now self-decodable. This implies that the PDU is decodable without the combination with previous PDU's. This is useful if some PDU's are so heavily damaged that almost no information is reusable.

SUMMARY OF THE INVENTION

This invention is related to Type II and Type III schemes, where the received (re)transmissions are combined. These schemes can be seen as a link adaptation technique, since the redundancy can be adapted according to the channel conditions as for example described in 3GPP TSG RAN, "Physical Layer Aspects of High Speed Downlink Packet Access TR25.848 V5.0.0" and in Amitava Ghosh, Louay Jalloul, Mark Cudak, Brian Classon, "Performance of Coded Higher Order Modulation and Hybrid ARQ for Next Generation Cellular CDMA Systems", Proceedings of VTC 2000.

Another technique that falls under this category of link adaptation, is adaptive modulation and coding (AMC). A description of AMC can be found in the above-mentioned documents. The principle of AMC is to change the modulation and coding format in accordance with variations in the channel conditions or system restrictions. The channel conditions can be estimated e.g. based on feedback from the receiver. In a system with AMC, users in favorable positions e.g. users close to the cell site are typically assigned higher order modulation with higher code rates (e.g. 64 QAM with $R=\frac{3}{4}$ Turbo Codes), while users in unfavorable positions e.g. users close to the cell boundary, are assigned lower order modulation with lower code rates (e.g. QPSK with $R=\frac{1}{2}$ Turbo Codes).

In the following, different combinations of coding and modulation will be referred to as Modulation Coding Scheme (MCS) levels.

A transmission will be split into Transmission Time Intervals (TTI), whereas the MCS level could change each TTI interval (for HSDPA the TTI is equal to 2 ms).

Thus, depending on the channel conditions, different MCS levels can be scheduled. Packet size depends on MCS level and number of orthogonal codes allocated for a particular transmission. We will refer to MCS level and number of codes as Transport Format and Resource Combination (TFRC).

Apart from MCS used, bit combining method also influences the robustness of packets to the transmission errors.

There are different combining schemes, Chase Combining (CC) and Incremental Redundancy IR), that can be used for bit combining. In Chase Combining, always the same information and parity bits are sent to be combined and every version of packet is self decodable. The set of parity bits is always obtained by using the same puncturing scheme. Incremental Redundancy may use different sets of parity bits (obtained by different puncturing schemes) in consecutive packet transmissions. All these groups of obtained from different transmissions have to be stored in the soft buffer for combining. Hence, Incremental Redundancy provides more reliable transmission at the expense of increased soft buffer memory requirements.

DETAILED DESCRIPTION OF THE INVENTION

Figure 1:
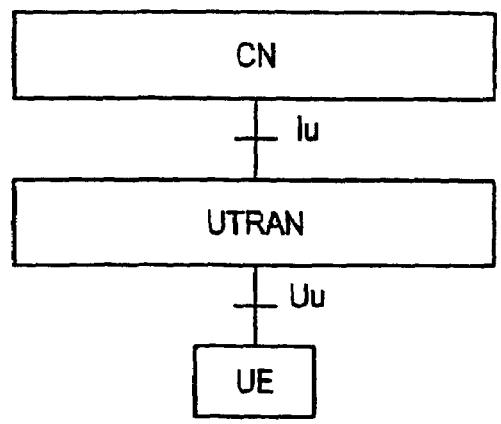
FIG. 1 shows a high level diagram of the UMTS architecture.

The high level architecture of Universal Mobile Telecommunication System (UMTS) is shown in FIG. 1. The network elements are functionally grouped into Core Network (CN), UMTS Terrestrial Radio Access Network (UTRAN) and User Equipment (UE). UTRAN is responsible for handling all radio-related functionality, while CN is responsible for routing calls and data connections to external networks. The interconnections of these network elements are defined by open interfaces as can be seen in the Figure. It should be noted that UMTS system is modular and it is therefore possible to have several network elements of the same type.

Figure 2:
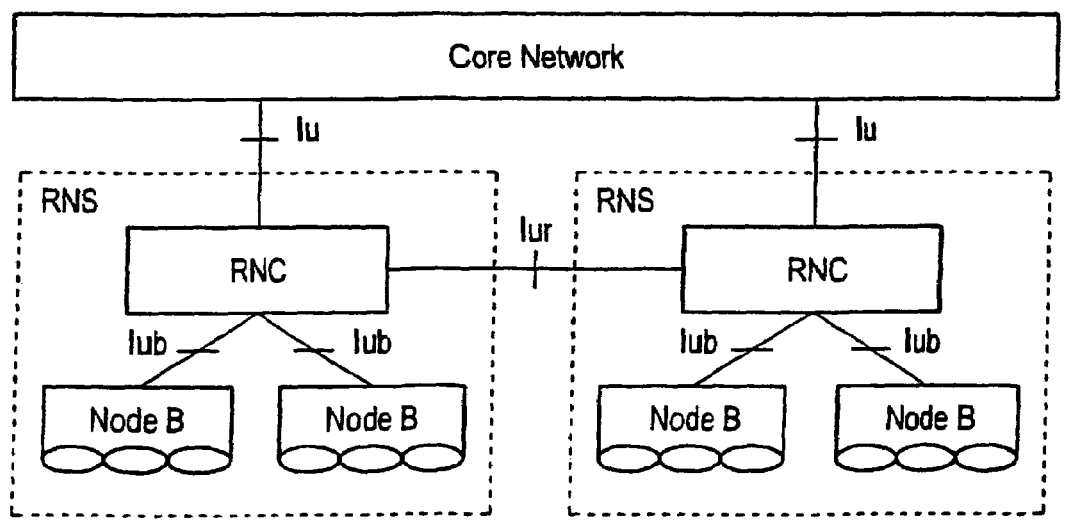
FIG. 2 illustrates the current architecture of UTRAN.

FIG. 2 illustrates the current architecture of UTRAN. A number of RNCs (Radio Network Controllers) are connected via wired or wireless links (Iub) to the CN. Each RNC controls one or several base stations (Node Bs) which in turn communicate via wireless links (not shown) with the UEs.

High Speed Downlink Packet Access (HSDPA) is a new technique that is standardised (see for example, 3GPP TSG RAN "Physical Layer Aspects of High Speed Downlink Packet Access TR25.848" V5.0.0 or 3GPP TSG RAN TR 25.308: "High Speed Downlink Packet Access (HSDPA): Overall Description Stage 2", V5.2.0). It shall provide higher data rates in the downlink by introducing enhancements at the Uu interface such as adaptive modulation and coding. HSDPA relies on hybrid Automatic Repeat Request protocol (HARQ) Type 11/111, rapid selection of users which are active on the shared channel and adaptation of transmission format parameters according to the time varying channel conditions. The invention is particularly applicable to HSDPA but is not restricted to this system. Therefore the data transmission does not necessarily have to be in the downlink nor does it depend on a particular radio access scheme.

Figure 3:
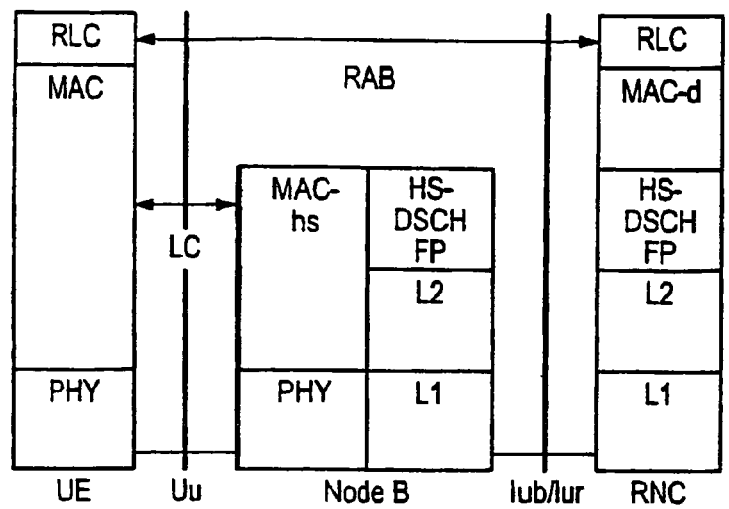
FIG. 3 shows a user plan radio interface architecture of HSDPA.

The User Plane Radio Interface Protocol Architecture of HSDPA is shown in FIG. 3. The HARQ protocol and scheduling function belong to the Medium Access Control High Speed (MAC-hs) sublayer which is distributed across Node B and UE. It should be noted that an SR ARQ protocol based on sliding window mechanisms could be also established between RNC and UE on the level of the Radio Link Control (RLC) sublayer in an acknowledged mode. Parameters of the protocols are configured by signalling in the control plane. This signaling is governed by a Radio Resource Control (RRC) protocol. The service that is offered from RLC sublayer for point-to-point connection between CN and UE is referred to as Radio Access Bearer (RAB).

Each RAB is subsequently mapped to a service offered from MAC layer. This service is referred to as Logical Channel (LC).

The performance of high speed packet transmission may depend on technical characteristics of the mobile UE capabilities. These could be signaled from the UE entity to the RNC entity during connection establishment using the RRC protocol, Over a feedback channel information is sent from the receiver to the transmitter that notifies the transmitter whether a data packet has been acknowledged (ACK) or not (NAK). Usually there is some delay until ACK/NAKs can be sent, due to processing time the transmitter spends on demodulation and decoding. HARQ Type 11/111 schemes put severe requirements on the receiver's memory size to store the soft decision values for subsequent combining. This buffer is in the following called soft buffer.

One method to overcome this constraint is to introduce a very fast feedback channel without an involvement of the Radio Link Control (RLC) protocol in RNC and UE. A scheduler is located in Node B so that retransmissions can be rapidly requested thus allowing small delays and high data rates.

Figure 4:
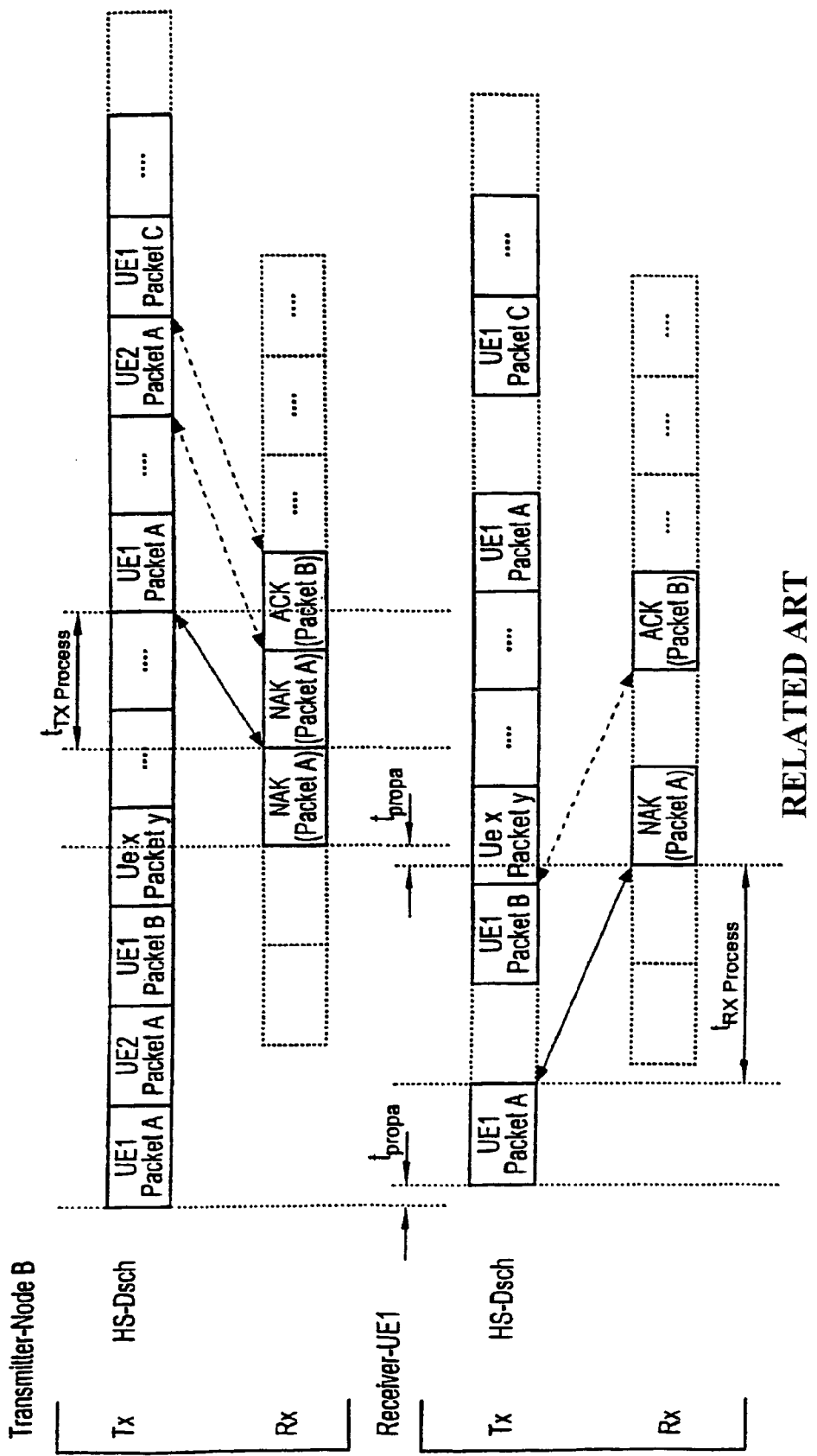
FIG. 4 shows exemplarily the timing relations of an HARQ process.

The functional behavior of one HARQ process is illustrated in FIG. 4. A physical channel is used to transmit data to a receiver. In this case it is a so-called HS-DSCH (High Speed-Downlink Shared Channel), where different users are time multiplexed. As apparent from the figure, a transmitter Base Station (Node B) transmits to a receiver called User Equipment (UE1). Node B transmits (Tx) a data packet A to the UE1. Before the data is received (Rx) by the UE1 there is a propagation delay. UE1 will demodulate and decode the packet A. After a UE1 processing time of $t_{RX\,process}$ an ACK or NAK will be sent (depending on if the packet A has been received correctly or not). In this case UE1 sends a NAK assuming that Packet A has not been received correctly. If the NAK has been received and decoded correctly by the transmitter ($t_{propa}$ introduced once again by the radio channel), the transmitter can decide to resend the data packet after a processing time $t_{TX\,process}$. Thus the number of data packets that have to be stored depends on the number of simultaneously active HARQ processes.

Figure 5:
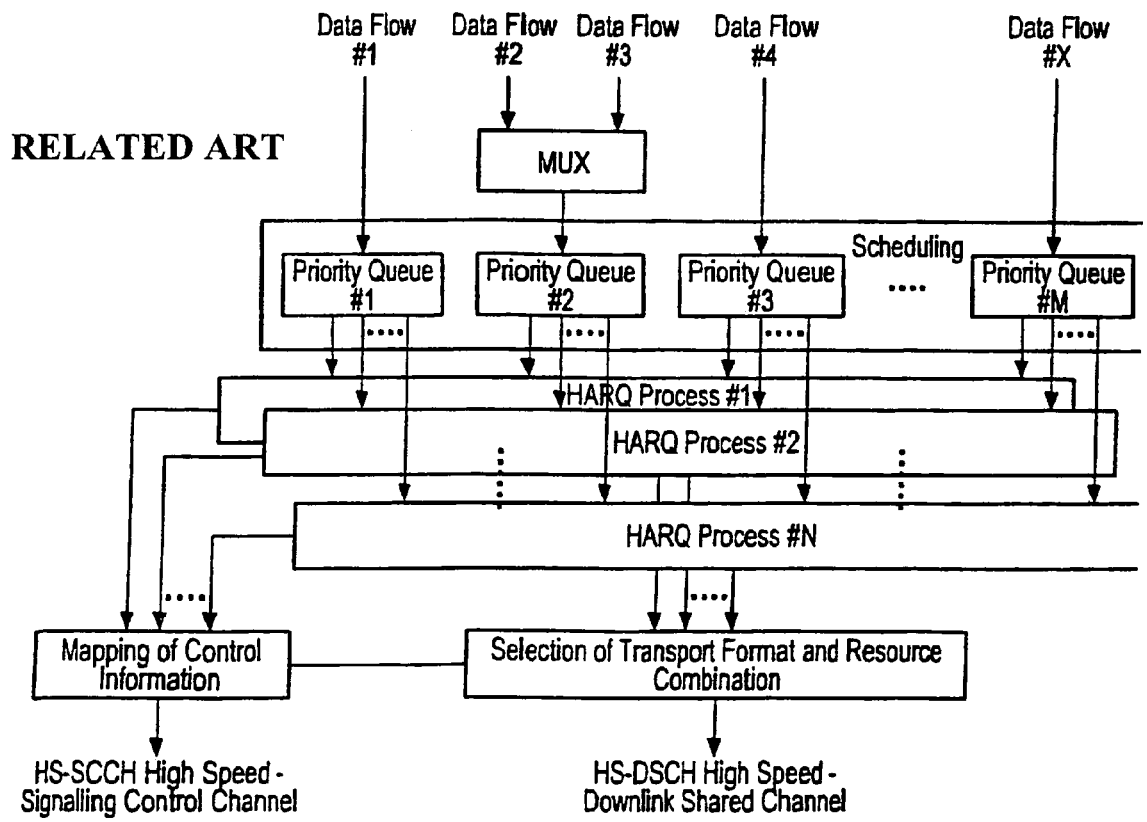
FIG. 5 shows the high level architecture of an HSDPA base station.

A high level architecture of HSDPA Base Station is depicted in FIG. 5. It is assumed there are #1 . . . # X different data flows (logical channels) with data packets to be transmitted from the Node B to the User Equipment (UE). The set of HARQ transmitting and receiving entities, located in Node B and UE respectively, will be referred to as HARQ processes. The maximum number of HARQ processes per UE is usually predefined. These data flows can have different Quality of Services (QoS), e.g. delay and error requirements and may require a different configuration of HARQ instances.

The scheduler will consider these parameters in allocating resources to different UEs. The scheduling function controls the allocation of the channel (HS-DSCH) to different users or to data flows of the same user, the current MCS level in one TTI and manages existing HARQ instances for each user.

A data flow or even a particular packet of a data flow may have a different priority. Therefore the data packets can be queued in different priority queues. Different data flows with similar QoS requirements may also be multiplexed together (e.g. data flow #3 and #4). Besides the HS-DSCH that carries the data packets there is control data which is mapped onto a High Speed-Shared Control Channel (HS-SCCH). This could carry data such as the HARQ process ID, the modulation scheme, code allocation, transport format etc. that is needed by the receiver to correctly receive, demodulate, combine and decode the packets.

As said before, the scheduler decides which of the N HARQ processes shall be used for transmission. Each HARQ process can have different window sizes. In HSDPA there is only a single HARQ process scheduled each TTI and each process works as a SAW protocol which corresponds to selective repeat ARQ with window size 1. In the example illustrated in FIG. 4, a retransmission can be scheduled after 5 transmission time intervals (TTI). It is not possible to schedule the same HARQ process earlier if packet combining shall be used because the processing is still ongoing. The HARQ process number as well as the sequence number has to be signalled separately to allow a proper combining even if the packet is not received correctly. In HSDPA the 1 bit sequence number is called New Data Indicator (NDI). Each time a new packet has been sent, the NDI is incremented. In HSDPA the HARQ process ID and the NDI are signalled on the HS-SCCH.

Furthermore in HSDPA each packet has a Transmission Sequence Number (TSN) for reordering of correctly received packets. This information is signalled inband in an header that is part of the packet. The TSN is increased for new each packet that is send by the transmitter. The receiver will check the TSN after successful decoding of an packet and deliver the packet only to higher layer if there is no previous packet of that data flow missing. In case of missing packets the received packet will be stored in the reordering buffer to wait for outstanding packets and to ensure in sequence delivery to higher layer. If the reordering buffer is full because the receiver is waiting for an outstanding packet for a long time the transmission must be stopped to avoid dropping or overwriting of packets. This situation is called stalling and can reduce the data throughput significantly. The stalling can be mitigated by different means such as time out timer, window forwarding etc. The receiver recognizes that it will not receive certain packets anymore and continues operation.

Usually a retransmission has a higher priority compared to new transmissions to reduce overall delay. Thus a packet will be scheduled every 6 TTI for successive erroneous decoding. A basic method is to adapt the number N of HARQ processes or the window size of a ARQ process to the round trip time. A practical implementation in this case would be an N channel Stop-and-Wait ARQ process. Continuous transmission while considering the round trip delay can be assured by switching between the HARQ processes every TTI. To support different priorities, a new transmission can be initiated on a HARQ process at any time even though there is a retransmission pending for that process. This will cause the UE soft buffer of the process to be flushed.

In a system using N-channel SAW ARQ processes the number of HARQ processes is chosen according to the round trip delay to provide continuous transmission while minimizing the number of processes. In the same manner will the window size be selected according to the RTT for window based ARQ mechanisms. Since the RTT can vary during transmission so the initial configuration may not be optimum anymore.

Different data flows can have different QoS and will therefore also have different process configurations (e.g. maximum number of retransmissions). A scheduler may preempt a certain transmission according to QoS attributes (priority, delay requirement, guaranteed bit rate and other parameters) known by the scheduler. The formulation preemption of higher priority data over lower priority data will be used in the following although the reason for preemption may be a QoS attribute other than priority (e.g. delay requirement).

After the UE data was scheduled to the appropriate HARQ process the transport format (e.g. transport block size) and resource combination (e.g. number and index of codes) for the data need to be selected. Depending on the channel conditions different MCS levels and thus packet sizes can be scheduled.

Figure 6:
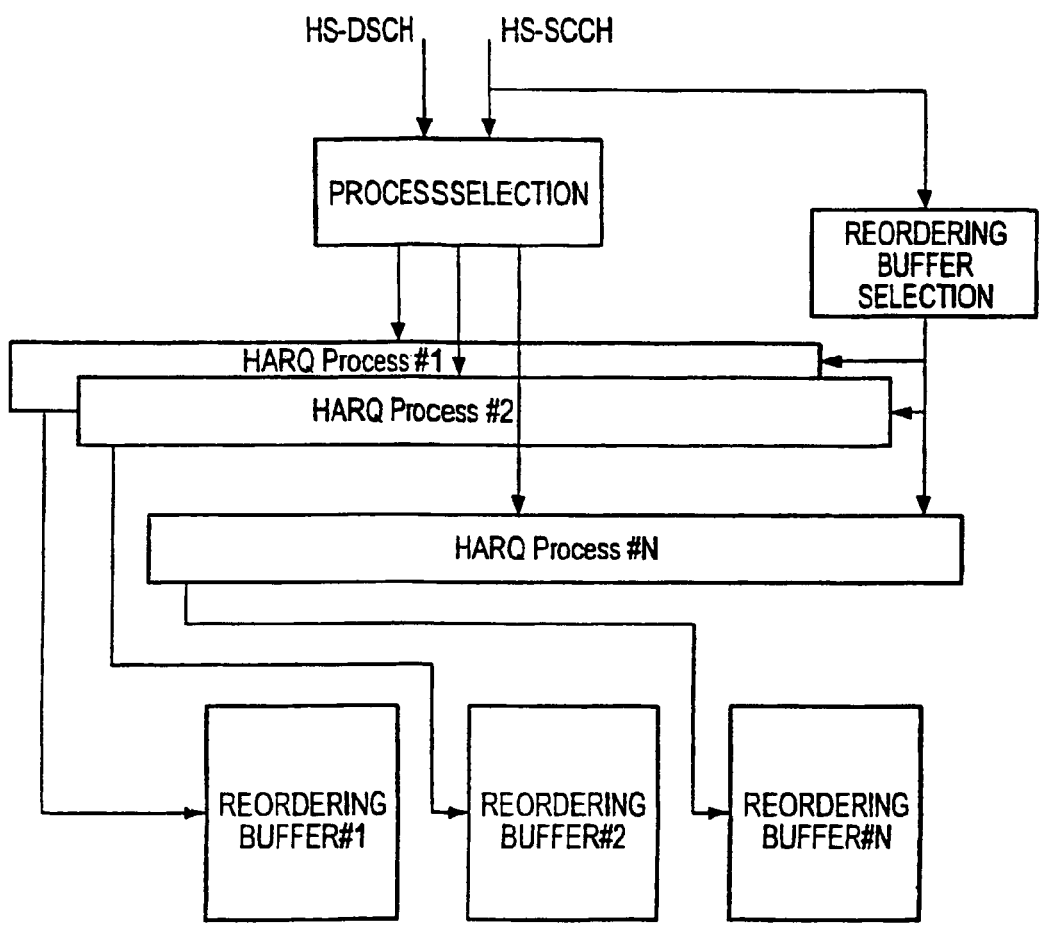
FIG. 6 illustrates a high level architecture of an HSDPA mobile station.

The UE HSDPA architecture is shown in FIG. 6. It can be noted that each HARQ process is assigned a certain amount of soft buffer memory for combining the bits of the packets from outstanding retransmissions. Once a packet is received successfully, it is forwarded to the reordering buffer providing the in-sequence delivery to RLC sublayer. According to the conventional architecture, the reordering queue is tied to a specific priority.

It should be noted that the available soft buffer size depends on the UE radio access capability parameters. Processing time of UE for a certain MCS level and minimum inter-TTI interval (minimum time between two successive scheduling instants) can also be considered as capability parameters. These are signaled from the UE to the RNC by RRC protocol and further from RNC to Node B.

One constraint for current communication systems is that different priorities as part of QoS requirements of data need to be supported efficiently. Future packet switched applications will have low rate signalling (e.g. session initiation protocol) which is more delay critical than the data. Thus signalling in parallel to the data stream itself will have higher priority. In particular in mobile communication systems there is high priority radio resource signalling such as to prepare for or to carry out handover when changing the serving cell. Other radio resource management information may also be scheduled in-between of data transmission. This signalling is usually of low rate, but has to be very fast to avoid packet or even call drops.

Further, downlink messages are generally significantly larger than uplink messages since they typically include more parameters as described in more detail in 3GPP TSG RAN TS 25.331 "RRC Protocol Specification", V 5.0.0. At the same time, the signalling between RNC and UE using radio bearers mapped on dedicated channels is slow due to delays in the transport network between RNC and Node B and due to a larger TTI of dedicated channels. For example, as mentioned in 3GPP TSG RAN TS 34,108 "UE Conformance Testing", V 4.1.0, signalling radio bearers configured for downlink interactive traffic with a peak rate of 2048 kbps is configured with a payload in RLC packets of 136 bits and a TTI of 40 ms, that is with data rate of 3.4 kbps. For a typical RRC message size of 150 octets, signalling delay is 390 ms, assuming transport network delay of approximately 30 ms. For the payload corresponding to the lowest MCS in HSDPA (240 b), HSDPA TTI is equal to 2 ms and minimum inter-TTI interval is equal to 2 ms, signaling delay is 20 ms assuming 2 retransmissions per packet. Thus, it may be beneficial to route some signalling traffic over HSDPA connection.

Due to deep and long fades, which are likely when a mobile is located near the cell edge, it may happen that all HARQ processes are simultaneously in the state of combining packets. In such cases it could be required to handover to a different cell. Some signalling is required for this purpose. However, scheduling any new data to the occupied processes will result in flushing the contents of the UE soft buffer for these particular processes. This causes an inefficient use of radio resources because already transmitted packets (although not received correctly and currently in the process of combining) are discarded. It should be noted that the packet size of the data that is discarded could be quite large compared to the one of higher priority signalling.

Another problem that occurs in case of insequence delivery to higher layer is stalling. The flushing of packets could cause gaps in the reordering entity. Already successfully received packet can not be delivered to higher layer because previous packets are missing. If the flushed data can be resend, the problem is less severe, but still more retransmissions will be required because combined bits of the unsuccessfully received packets were discarded.

The object of the present invention is consequently to avoid flushing of lower priority packets in the soft buffer of the UE when they are superseded by higher priority data. This object is solved by a method of HARQ process configuration according to claims 1 and 2. According to the invention, some HARQ processes are either reserved or additional HARQ processes are pre-configured for high priority data. This allows the efficient support for data flows of different priorities and in particular for delay critical signalling.

If the Node B receives low rate and delay sensitive data such as higher priority signaling, it will switch to the reserved or additional HARQ processes (if required), instead of using engaged HARQ processes which would cause the UE soft buffer to be flushed. Furthermore the Node B or RNC will signal to use a separate reordering queue for such data to avoid delays caused by reordering for in sequence delivery.

According to the conventional architecture, any HARQ process can be used for any priority queue. According to one embodiment of the invention, it is proposed to restrict the use of HARQ processes. Some HARQ processes may be limited for specific data flows of high priority, while other HARQ processes may maintain full flexibility. Such HARQ processes of limited use will be called reserved HARQ processes. By this it is ensured that high priority data can be sent without waiting for completion of outstanding retransmissions or flushing the UE soft buffer of an HARQ process.

It should be noted that the restricted use of some HARQ processes limits the scheduling in particular for continuous transmission. It also reduces data throughput since the number of HARQ processes with full flexibility is insufficient for continuous transmission during round trip delay.

In another embodiment of the invention the number of HARQ processes is increased with respect to the minimum required by RTT to accommodate higher priority data. These additional HARQ processes which may also have limited functionality are in the following called additional HARQ processes. The limited functionality will most likely be caused by reserving smaller soft buffer sizes for additional HARQ processes. Thus, only some (lower) MCS can be scheduled with this processes.

Soft buffer memory that is required for one HARQ process depends on the following:
- type of bit combining (Incremental Redundancy, Chase Combining)
- and
- highest possible TFRC, i.e. the highest possible MCS and maximum number of orthogonal codes to be used with a particular process.

Once an HARQ process is added, it may be possible to restrict its usage just for certain type of bit combining, MCS levels and number of orthogonal codes.

In the following, the embodiments of the invention will be described in further detail.

Figure 9:
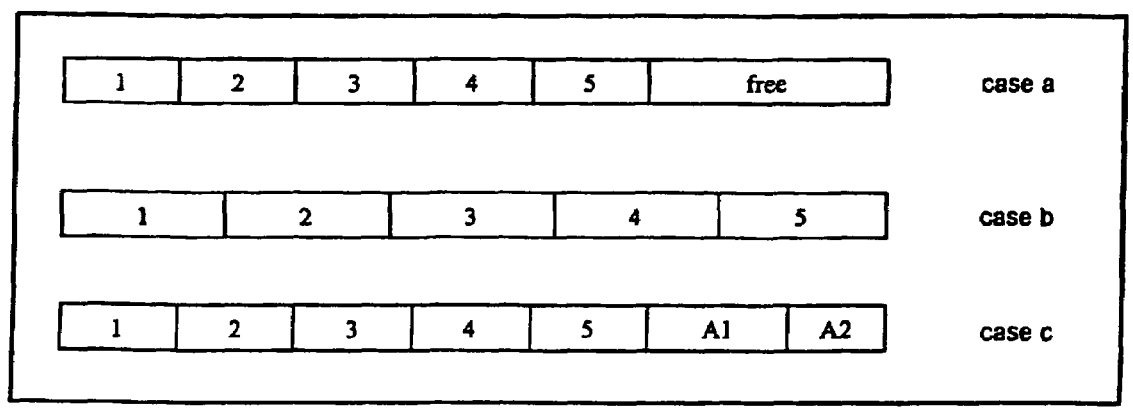
FIG. 9 illustrates an example of an HARQ process configuration.

An example of process configuration is shown in FIG. 9. FIG. 9 plots soft buffer distribution among HARQ processes. We assume that 5 processes are enough to support continuous transmission during one round trip time (case a). Some memory in the soft buffer is still available. Thus, 5 HARQ processes may be configured to so to support higher TFRC or to support more reliable transmission (Incremental Redundancy instead of Chase Combining)—case b. Alternatively, if needed, some processes may be added. In the figure, case c, one process with unrestricted functionality (A1) and the other with restricted functionality (A2) in terms of maximum allowed MCS and/or transmission reliability are configured.

The following decision making rules may be envisaged for the embodiment of the invention assuming initial configuration of HARQ processes. If the soft buffer size of a UE is such that no HARQ process can be added, one HARQ process may be reserved. If the soft buffer size allows, the process can be added. In this case, the process may be configured only for certain (lower) TFRCs or may support less reliable transmission (Chase Combining instead of Incremental Redundancy), thus enabling more efficient use of the soft buffer for high priority and low rate data.

Additional HARQ processes also cause an increased signalling range for identifying the HARQ process to the UE. The signalling of the HARQ process ID via a shared control channel is usually done by a fixed number of bits. Additional bits for the signalling may not be necessary because the number of HARQ processes that can be signalled is in the range of the power of two (e.g. 8 HARQ processes).

The method of configuring an additional HARQ process consequently requires that additional soft buffer memory is reserved for combining. In order to address such constraints, once an HARQ process is added, it may be possible to restrict its usage just for certain MCS levels, e.g. restrict its usage for certain packet sizes. Thus, the soft buffer size for such limited HARQ processes is minimized. This is illustrated in query 400 with subsequent steps 420 and 440 in FIG. 7.

An additional advantage of adding an HARQ process resides in the fact that all ongoing regular HARQ processes are not affected and that consequently the data throughput is not reduced.

In case query 300 results in that available soft buffer size is not sufficient for adding a further HARQ process, the transmitter pre-configures at least one reserved HARQ process for instantaneous transmission of delay sensitive data (step 340).

Hence, no additional soft buffer memory is required at the receiver, but a reduced data throughput is the result, since the number of HARQ processes with full functionality is reduced.

Variable RTT shall be monitored by the Node B in order to dynamically configure reserved processes. Furthermore, the state of the HARQ processes should be considered when scheduling high priority data in order to prevent soft buffer flushing. To avoid idle periods due to lack of available HARQ processes, it is necessary that number of HARQ processes is matched to the round trip time.

Round trip time (RTT) dominantly depends on UE and Node B processing time, UE minimum inter-TTI interval and timing of the shared channels. While the HS-SCCH and the HS-DSCH in the downlink are shared channels, the ACK/NAK in the uplink are sent on a dedicated channel. The timing of the shared channels needs to be aligned with other UE's. Therefore there can be different offsets between the channels having an effect on the round trip delay. Finally, during the time between traffic bursts, continuous transmission supported by all HARQ processes is not necessary. In summary the number of HARQ processes to support data transmission depends on capabilities, configuration and traffic statistic and can also vary dynamically.

If there are any additional HARQ processes existing, Node B will monitor RTT, traffic burstiness and QoS (required throughput) in order to estimate the number of processes that are necessary for transmission. Should the number be smaller than the one estimated at the time of process addition, these processes will be deleted and some of the remaining processes reserved for high priority data.

Figure 7:
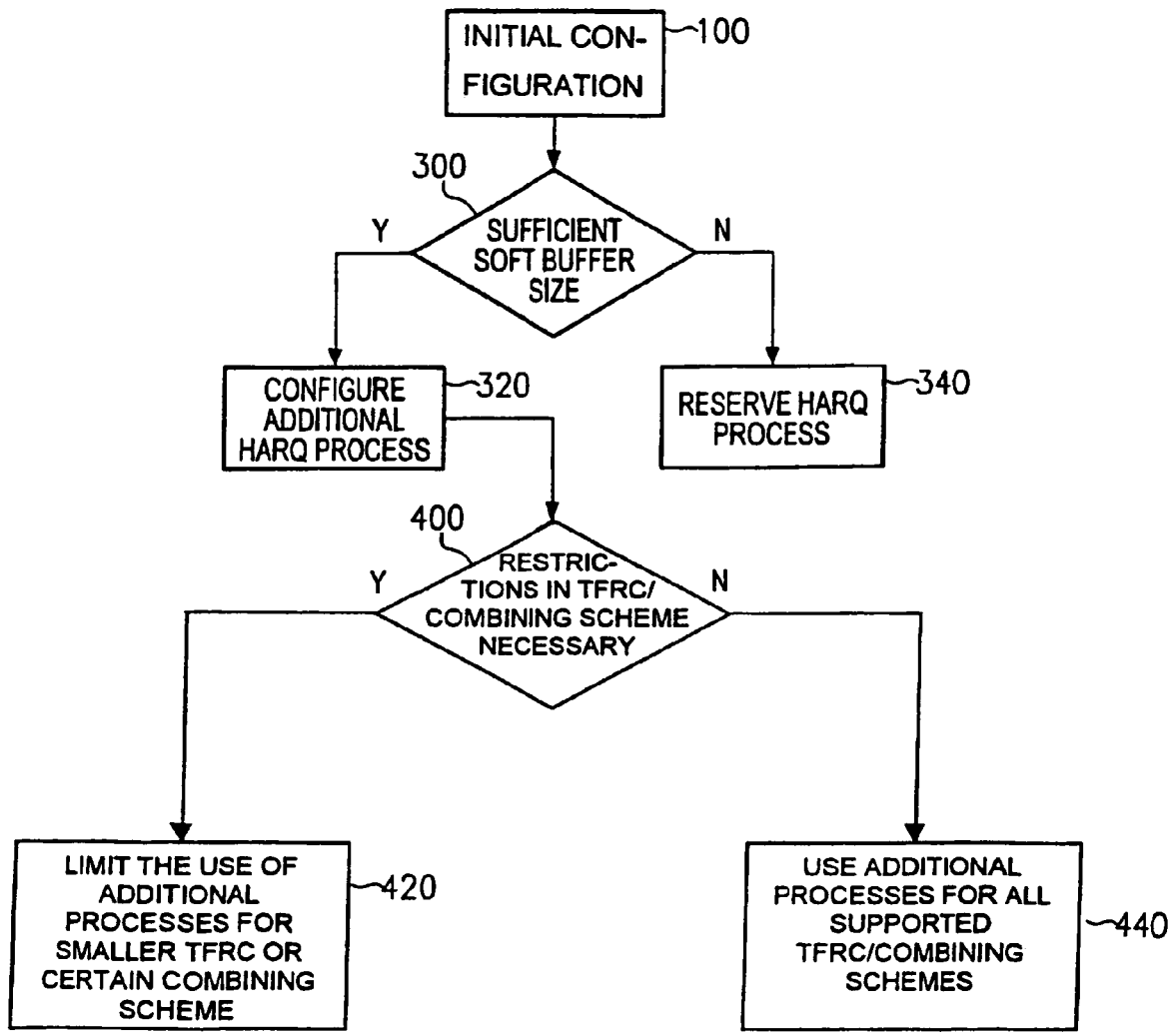
FIG. 7 illustrates the dynamic HARQ process configuration according to the present invention.

The following decision making rules may be envisaged for the embodiments of the invention. If the soft buffer size of a UE is such that no HARQ process can be added, one HARQ process may be reserved. If the soft buffer size allows, the process can be added. In this case, the process may be configured only for certain (lower) MCS levels, thus enabling more efficient use of the soft buffer for high priority and low rate data. Decision process is depicted in FIG. 7 as described above.

Node B may use a separate reordering queue for some of reserved or additional HARQ processes. In the conventional standard, reordering queues are tied exclusively to priorities of certain data flows. Priority is not the only cause for packet preemption. For example, even though some data flows have same priorities, some of the packets may be more delay critical than others. In this case it would be beneficial to route these packets to the HARQ process with a separate reordering queue. This avoids additional delay due to reordering. Therefore, having reordering queue per priority and having it per HARQ process are two possible options.

Figure 8:
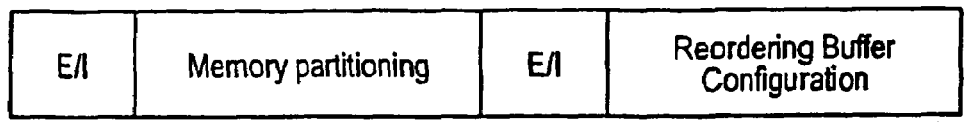
FIG. 8 illustrates a possible format of MAC-hs control information.

Some disadvantages of the conventional RRC signalling have been outlined above in connection with FIG. 3. It is particularly important to minimize the delay of the signaling used for HARQ process configuration and reconfiguration during RTT monitoring. When a control message related to MAC-hs needs to be carried to the UEs, the information is first sent from the MAC-hs in the Node B to the RRC in the RNC and only then RRC entity in RNC can forward the signalling message to corresponding entity in the UE. Thus, when high priority data shows up for the UE in MAC-hs buffers, delays will be introduced due to RRC signalling before the first packet can be sent to that UE. However, if the signalling is to be implemented between RNC and UE, than the formats of control packets between Node B and RNC (NBAP protocol) and of control packets between RNC and UE have to be specified. A possible control information format is illustrated in FIG. 8.

Since decisions on HARQ process addition/reservation are supposed to be carried out in the scheduler of Node B, it would be beneficial to send the signaling message directly from Node B to the UE. It should be noted that this solution does not precludes RRC signaling, but only complements it. To send this signaling information, MAC-hs packets with Number of MAC-d PDUs set to 0 can be used, and the control information can be put into payload. The semantics of the fields is as follows.

E/I bit denotes the options of explicit and implicit signaling. If explicit signaling of buffer allocation is used, soft buffer allocation (field Memory Partitioning) is sent as a vector whose length corresponds to maximum number of HARQ processes. If explicit signaling of reordering buffer allocation is used, a Reordering Buffer Configuration field is a vector of the same length denoting whether the reordering buffer is allocated per process or per priority. Implicit signaling is a default option in both cases and denotes uniform soft buffer partitioning and allocation of reordering buffer per priority respectively. To support continuous transmission during one RTT, variation of RTT shall be monitored by the Node B in order to dynamically configure reserved processes. If RTT decreases, smaller number of HARQ processes is needed. Thus, more functionality (higher maximum supported MCS, Incremental Redundancy instead of Chase Combining) can be allocated to additional processes. Should RTT increase, higher number of HARQ processes is needed. This, for example, may require further reduction in functionality of additional processes.

The invention discloses an intelligent method for a flexible configuration of multiple parallel hybrid ARQ processes. The method minimizes the required buffer in the mobile station to store the soft values for combining while reducing the latency to transmit packets of different priority. The latency is reduced without having to flush the bits corresponding to outstanding retransmissions in the soft buffer of the UE.

The invention enables efficient HARQ process configuration depending on UE capabilities and enables efficient soft buffer management in case of HARQ process addition. Further, the invention decreases the possibility of stalling in the reordering buffer by preventing the superceding of higher priority data by lower priority data and by configuring reordering buffer per HARQ process. By adapting the number of HARQ processes to the round trip time the use of the UE soft buffer is optimized.

It is clear to those skilled in the art, that the above described embodiments can be combined, in particular it is possible to form a configuration, wherein an additional HARQ process and at the same time have reserved HARQ process are used to transmit delay sensitive high priority data.

The invention claimed is:

1. A method of scheduling a plurality of HARQ processes involving packet combining in a mobile communication system, wherein a plurality of HARQ processes are established in a transmitter and a receiver, said method comprising the steps of:

configuring a plurality of HARQ processes of unrestricted use for data flows having predetermined quality of service (QoS) requirements and configuring at least one reserved HARQ process for data flows of high priority with specific QoS requirements, wherein the reserved HARQ process is restricted to some lower modulation coding scheme levels in accordance with a memory size of a soft buffer reserved for the reserved HARQ process.

2. The method according to claim 1 comprising the additional steps of:

scheduling the plurality of data flows from at least one priority queue and emptying the priority queue to one or the plurality of configured HARQ processes for transmission.

3. The method according to claim 1, wherein the reserved HARQ process has a less complete functionality compared with the plurality of HARQ processes of unrestricted use.

4. The method according to claim 1, wherein the reserved HARQ process supports a lower transport format resource combination compared with the transport format resource combination of the plurality of HARQ processes.

5. The method according to claim 1, wherein the reserved HARQ process supports Chase Combining or Incremental Redundancy according to an available memory size in the soft buffer.

6. The method according to claim 1, wherein for the reserved HARQ process, a smaller soft buffer size is reserved at the receiver compared with that reserved for the plurality of HARQ processes.

7. The method according to claim 1, wherein the transmitter signals to the receiver to use a separate re-ordering buffer for the reserved HARQ process.

8. The method according to claim 1, wherein an identification for the reserved HARQ process is signaled to the receiver.

9. The method according to claim 1, wherein the number of reserved processes and the number of the plurality of HARQ processes are matched to the round trip delay (RTD) caused by transmission time and processing time at the receiver and the transmitter.

10. The method according to claim 1, wherein the number of configured HARQ processes varies dynamically in accordance with a system parameter.

11. The method according to claim 10, wherein the system parameter is one of the plurality of round trip time, processing time, traffic burstiness, quality of service, modulation coding scheme, timing of shared channels and minimum transmission time interval.

12. The method according to claim 1, wherein a configuration for the HARQ processes is signaled from the transmitter to the receiver by an HARQ protocol control packet.

13. The method according to claim 12, wherein the HARQ protocol control packet is identified by inband signaling.

14. The method according to claim 12, wherein the signaling is performed explicitly or implicitly.

* * * * *